United States Patent [19]

Rice

[11] Patent Number: 4,810,580
[45] Date of Patent: Mar. 7, 1989

[54] SILICON NITRIDE COATED CLAYS AND METHOD OF PREPARATION

[75] Inventor: C. Arlyn Rice, Sandersville, Ga.

[73] Assignee: E.C.C. America Inc., Atlanta, Ga.

[21] Appl. No.: 114,538

[22] Filed: Oct. 29, 1987

[51] Int. Cl.$^4$ .................... B32B 5/16; C23C 16/00
[52] U.S. Cl. ..................... 428/409; 427/248.1; 427/255; 428/404; 428/698; 523/216; 523/508
[58] Field of Search ............. 428/408, 409, 402, 404, 428/698; 524/262, 114, 447; 523/216, 508; 427/248.1, 255

[56] References Cited

U.S. PATENT DOCUMENTS

| | | | |
|---|---|---|---|
| 3,567,680 | 3/1971 | Iannicelli | 524/262 |
| 4,336,304 | 6/1982 | Landingham et al. | 428/408 X |
| 4,412,018 | 10/1983 | Finlayson et al. | 523/508 |
| 4,522,958 | 6/1985 | Das et al. | 523/216 X |
| 4,690,868 | 9/1987 | Rice | 428/409 |

OTHER PUBLICATIONS

R. K. Brow et al., "Thermochemical Nitridation of Microporous Silica Films in Ammonia", Journal of the American Ceramic Society, vol. 70, No. 1, Jan. 1987, pp. 9–14.

Choi et al., "Synthesis of $\beta'$-Sialon with Various Compositions from Kaolin", Jul. 4, 1986, pp. 1–12.

Primary Examiner—Thomas J. Herbert
Attorney, Agent, or Firm—Klauber & Jackson

[57] ABSTRACT

A modified clay mineral, such as a kaolin clay, is disclosed in which nitridation of the silicon atoms of the clay has been effected. This may be accomplished by reaction of the clay with NH$_3$ at temperatures above 1000° C.

8 Claims, No Drawings

SILICON NITRIDE COATED CLAYS AND METHOD OF PREPARATION

FIELD OF THE INVENTION

This invention relates to the chemical modification of clay minerals such as kaolin. More particularly, it relates to silicon nitride coated kaolin and a method of preparation thereof.

BACKGROUND OF THE INVENTION

This invention relates generally to clay and clay minerals, i.e., to crystalline layered lattice silicates having the general formula $E_iM_xSi_yO_n(OH)_m$, where M is Al, Mg, or Fe; $x=2$ to 6; $y=2$ to 8, $n=2$ to 20, $m=0$ to 8, and $E_i$ is one or more exchangeable ions (K, Na, Mg, Ca, Ba, Fe, Li, etc.). These layered silicates will hereinafter be referred to in this specification as "layered lattice silicates". More specifically, the invention relates to a method for nitriding materials of this type, including, e.g., kaolins and kaolinitic minerals, in order to produce products having new and unusual properties rendering same useful for a variety of purposes, including especially as fillers in plastic, rubber, ceramics and other systems.

Some modification of clays with nitrogenous compounds are known.

For example, organophilic organic-clay complexes are known which are dispersible in organic liquids to form a gel and thus are useful as gelling agents for paints and the like. They may be prepared by cation exchange with the sodium form of a smectite type clay, employing an organic cationic compound, preferably a quaternary ammonium salt, see Finlayson et al, U.S. Pat. No. 4,412,018. Such cation exchanges do not involve the silicon atoms of the clay.

C. A. Rice, U.S. Pat. No. 4,690,868 issued Sept. 1, 1987 describes the surface modification of clays, in particular kaolin, by a reaction with ammonia gas at temperatures below 1000° C., preferably in the temperature range of about 700° C. to 900° C., to form bound $NH_2$ groups on the surface. The surface aminated products are particularly useful as fillers in resin or plastic systems.

Silicon nitride is a known compound and is described in Grant and Hackh's Chemical Dictionary as $Si_3N_4$, a white powder insoluble in water, very resistant to thermal shock and chemical reagents.

An article by R. K. Brow and C. G. Pantano in J. Am. Ceram. Soc., vol. 70(1) 9–14 (1987), reports an experimental study of the nitridation of microporous silicon dioxide thin films in ammonia. Sol-gel-derived silicon dioxide appeared to be an effective precursor material for the development of silicon oxynitride thin films by a high-temperature reaction with ammonia. Because of their initial microporosity, these films are rapidly incorporated with high concentrations of nitrogen (up to 40 mol %) to produce a more compositionally homogeneous material than is formed when thermally grown silicon dioxide is nitrided. The chemical structure of the film was monitored as a function of treatment temperature using X-ray photoelectron spectroscopy, which showed that the nitrogen converted from amine to nitride species as the treatment temperature exceeded 800° C. The utilization of silicon nitride and silicon oxynitride films in microelectronic device application is mentioned.

An article by Sang Wook Choi et al in the *Journal the Korean Ceramic Society*, vol. 23(5) 17–24 (1986) published on Oct. 30, 1986, describes the synthesis of products named $\beta'$ sialon from compositions containing kaolin, graphite and silicon or aluminum at temperatures in the range of 1300°–1450° C. under a flowing gas of 90% $N_2$–10% $H_2$ for 20 hours. A composition of kaolin and graphite was also treated. The graphite functions as a reducing agent. The reactions are termed carbothermal reduction-nitridation.

In accordance with the foregoing, it may be regarded as an object of the present invention, to provide a relatively simple, inexpensive, and effective process, which enables surface modification of a clay mineral, such as a kaolin clay, by surface nitride groups, thereby providing a new product having valuable application, e.g., as a filler for paints, plastics, rubbers, paper, ceramics and possibly microelectronics.

It is a further object of the present invention, to provide a process yielding products which enable the production of filled systems, for example, resin-filled systems incorporating the products of the invention, which have superior properties with respect to mechanical aspects of same, as compared to prior art filled systems based upon prior art kaolin clay, and similar fillers.

SUMMARY OF THE INVENTION

According to the invention a clay such as a hydrous kaolin clay, i.e., a kaolin that has not been subjected to calcination, can be coated with a silicon nitride layer when reacted at above 1000° C., preferably 1100° to 1500° C., in a gaseous $NH_3$ atmosphere. The novel product is gray in color, will not disperse in organic or inorganic solvents and is more abrasive than a normal calcined kaolin (reacted in air). ESCA analysis of the silicon nitride coated product displays a split in the silicon peak with the new peak shifting from 105.8 to 106.4 ev. The kaolin should be hydrous because the hydroxyl groups are involved in reaction with $NH_3$. Although Applicant does not wish to be bound by theory, it is believed that nitridation occurs in situ of the silicon atoms of the clay, which remain bound to the clay in the process, and that the nitridation forms structures comprising Si, N or Si, N, O.

With respect further to terminology, it is noted that the prior art literature, including numerous of the prior art patents relating to the field of kaolin products and processing, often uses the term "hydrous" to refer to a kaolin which has not been subjected to calcination—more specifically, which has not been subjected to temperatures above about 450° C., which temperatures serve to impair the basic crystal structure of kaolin. These so-called "hydrous" clays may have been produced from crude kaolins, which have been subjected to beneficiation, as, for example, to froth flotation, to magnetic separation, to mechanical delamination, grinding, or similar comminution, but not to the mentioned heating as would impair the crystal structure.

In an accurate technical sense, the description of these materials as "hydrous" is, however, incorrect. More specifically, there is no molecular water actually present in the kaolinite structure. Thus, although the composition can be (and often is) arbitrarily written in the form $2\,H_2O\cdot Al_2O_3\cdot 2SiO_2$, it is now well-known that kaolinite is an aluminum hydroxide silicate of approximate composition $Al_2(OH)_4Si_2O_5$ (which equates to the hydrated formula just cited). Once the kaolin is subjected to calcination, which, for the purposes of this specification means being subjected to heating of 450° C. or higher for a period which eliminates the hydroxyl groups, the crystalline structure of the kaolinite is destroyed. Therefore, such material, having been thus calcined, cannot correctly be referred to as a "kaolin". Accordingly, it should be appreciated that henceforth in this specification, when the term "kaolin" or "kaolinite" is utilized, such term necessarily implies that the original structure of the material is intact. Thus, the term "kaolin" as used herein, can be considered to be equivalent to the technically inaccurate (but oft-occurring) prior art usage, "hydrous kaolin" or sometimes simply "hydrous clay."

The composition to be treated may be reacted with ammonia gas. Although not required, this may be a mixture including as well an inert gas carrier, such as nitrogen or argon, and/or a reducing gas such as CO. A flowing gas atmosphere at flow rates of 5 SCFH (standard cubic feet per hour) or higher, is suitable. Useful reaction time is between 5 and 75 minutes.

Various clay and clay minerals may be treated by the method of the invention, which is applicable generally to crystalline layered lattice silicates. Thus, for example, clays of the halloysite, illite, kaolinite, montmorillonite, palygorskite groups, talc, mica, wollastonite, and various other clays can be readily treated by the present invention.

The products of the invention may be used as fillers in elastomers viz., as fillers in a rubber matrix, for tire applications to increase the grip of the tread and abrasion resistance. They are also useful in ceramics to improve strength and durability.

DETAILED DESCRIPTION

The invention is illustrated by the following Examples which are intended to be exemplary and not limitative.

EXAMPLE I

An air classified kaolin having 82% by weight of the particles thereof of less than 2 microns E.S.D. (equivalent spherical diameter) was screw fed into a rotary furnace which had been heated to 1085° C. in pure gaseous $NH_3$ for 25 minutes. The $NH_3$ reacted with the silicon on the surface to produce a silicon nitride surface at this high temperature. The product is gray with a 37 GE brightness. In all instances in this specification it will be understood that brightness values were obtained according to the specification established by TAPPI procedure T646 os-75.

EXAMPLE II

A water washed kaolin (particle size distribution 100% < 1µ E.S.D.) was reacted in the same manner as in Example I. This particular feed clay is normally calcined in air at a similar temperature to produce a product sold under the tradename ALPHATEX with a 93 GE brightness. When calcined in $NH_3$, it has a brightness of <40 GE, and is 20% more abrasive than the ALPHATEX product (106.2 vs. 86 Brunning Abrasion). The product took up 0.4% nitrogen during the process.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A 2-dimensional layered lattice silicate having the general formula $E_iM_xSi_yO_n(OH)_m$, where M is Al, Mg, or Fe; x=2 to 6; y=2 to 8; n=2 to 20; m=0 to 8; and $E_i$ is one or more exchangeable ions, which has been modified by the nitridation of silicon atoms of the silicate to form silicon nitride at the surface.

2. A product in accordance with claim 1, wherein said silicate is a kaolin clay.

3. A filled elastomer system, comprising an elastomer matrix, and as a filter, a 2-dimensional layered lattice silicate having the general formula $E_iM_xSi_yO_n(OH)_m$, where M is Al, Mg, or Fe; x=2 to 6; y=2 8: n=2 to 20; m=0 to 8; and $E_i$ is one or more exchangeable ions, which filler has been modified by the nitridation of silicon atoms of the silicate to form silicon nitride at the surface.

4. A method for directly nitriding the surface of a 2-dimensional layered lattice silicate having the general formula $E_1M_xSi_yO_n(OH)_m$, where M is Al, Mg, or Fe; x=2 to 6; y=2 to 8; n=2 to 20; m=0 to 8; and $E_i$ is one or more exchangeable ions comprising: reacting said layered lattice silicate in particulate form with a reactant system comprising gaseous $NH_3$ at temperatures above 1000° C. for a time in the range of about 5 to 75 minutes to cause nitridation of silicon atoms of the silicate to form silicon nitride groups at said surface.

5. A method in accordance with claim 4, wherein said reaction is conducted at temperatures in the range of from about 1100° to 1500° C.

6. A method in accordance with claim 4, wherein said reaction is conducted in a rotary furnace.

7. A method in accordance with claim 4, wherein said layered lattice silicate is a clay or clay mineral.

8. A method in accordance with claim 7, wherein said silicate is a kaolin clay.

* * * * *